(12) United States Patent
Kwag

(10) Patent No.: US 8,780,734 B2
(45) Date of Patent: Jul. 15, 2014

(54) APPARATUS AND METHOD FOR SETTING MAXIMUM TRANSMISSION UNIT IN USER TERMINAL

(75) Inventor: Yun Geun Kwag, Seongnam-si (KR)

(73) Assignee: Pantech Co., Ltd., Seoul (KR)

(*) Notice: Subject to any disclaimer, the term of this patent is extended or adjusted under 35 U.S.C. 154(b) by 239 days.

(21) Appl. No.: 13/177,736

(22) Filed: Jul. 7, 2011

(65) Prior Publication Data

US 2012/0176912 A1  Jul. 12, 2012

(30) Foreign Application Priority Data

Jan. 11, 2011 (KR) .................. 10-2011-0002509

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |

(52) U.S. Cl.
USPC ...................... 370/242; 370/233; 370/235

(58) Field of Classification Search
USPC ............................. 370/233, 235, 242
See application file for complete search history.

(56) References Cited

U.S. PATENT DOCUMENTS

| 5,959,974 A * | 9/1999 | Badt et al. .................... 370/233 |
| 2007/0115963 A1* | 5/2007 | Vadlakonda et al. ......... 370/389 |
| 2007/0171828 A1* | 7/2007 | Dalal et al. .................... 370/235 |

FOREIGN PATENT DOCUMENTS

KR  10-2008-0035204   4/2008

OTHER PUBLICATIONS

Inamura et al., RFC 3481, "TCP over 2.5G/3G", Feb. 2003.*

* cited by examiner

Primary Examiner — Noel Beharry
Assistant Examiner — Farhad Ali
(74) Attorney, Agent, or Firm — H.C. Park & Associates, PLC

(57) ABSTRACT

An apparatus to set a maximum transmission unit (MTU) acquires information about a wireless communication network, sets a basic MTU value based on the kind of wireless communication network as an MTU value, and checks the validity of the set MTU value. The validity of the set MTU value is checked by dividing packets by the set MTU value, transmitting the packets to a communication counterpart, and comparing a response message's error rate to a reference value. The apparatus increases the set MTU value if the set MTU value is valid, decreases the set MTU value if the set MTU value is not valid, and detects an optimal MTU value. The optimal MTU value may refer to a longest MTU value among checked MTU values that has an error rate less than the reference value according to the validity-checking process.

16 Claims, 2 Drawing Sheets

APPARATUS AND METHOD FOR SETTING MAXIMUM TRANSMISSION UNIT IN USER TERMINAL

CROSS-REFERENCE TO RELATED APPLICATION

This application claims priority from and the benefit of Korean Patent Application No. 10-2011-0002509, filed on Jan. 11, 2011, which is hereby incorporated by reference for all purposes as if fully set forth herein.

BACKGROUND

1. Field

The present disclosure relates to an apparatus and a method for setting a maximum transmission unit (MTU) and, more particularly, to an apparatus and a method for setting an MTU according to a communication network environment.

2. Discussion of the Background

A wireless communication technique has evolved from a first-generation (1G) analog wireless communication technique using a frequency-division multiple access (FDMA) scheme to a second-generation (2G) digital wireless communication technique using a code division multiple access (CDMA) or a time division multiple access (TDMA) method, and to a third-generation (3G) wireless communication technique (IMT-2000 (WCDMA), WiBro, etc.) for providing a voice service and a more comprehensive non-voice service (data, image or video). Research to develop a fourth-generation (4G) wireless communication technique for providing a complete multimedia wireless communication service is ongoing.

As described above, with the development of the wireless communication technique, new networks have been introduced and various wireless communication networks such as CDMA 2000, Wideband CDMA (WCDMA), High-Speed Downlink Packet Access (HSDPA), Wireless Broadband (WiBro), WiFi, WiMAX, or Long Term Evolution (LTE) have been used.

A user terminal performs data communication with a wireless communication network and may provide various data services to a user. In the related art, in an environment in which various wireless communication networks are used, data communication with a wireless communication network is performed using a maximum transmission unit (MTU) value (for example, 1,500 bytes), which is standardized for compatibility with other networks having different performance.

However, if data communication is performed using the MTU value fixed to the standardized value as described above, communication efficiency may be lower than possible according to the kind of the wireless communication network for performing data communication, or communication may be impossible if the MTU is too high and cannot be is supported.

For example, if a user terminal having an MTU value fixed to 1,500 bytes accesses a 4G network, such as an LTE network supporting an MTU of 2,000 bytes or more, to perform data communication with another terminal connected to the 4G network or to perform data communication with a server located in a broadband Internet network supporting an MTU of 2,000 bytes, communication may be inefficient since the network to which the user terminal is connected and the network to which the communication counterpart is connected supports the MTU of 2,000 bytes.

In another example, if the user terminal having the MTU value fixed to 1,500 bytes accesses a 2G network, such as a general packet radio service (GPRS) or CDMA network supporting an MTU of about 700 bytes, to perform data communication with a server located in a WCDMA network supporting an MTU of 2,000 bytes, the user terminal attempts to perform data communication using an MTU of 1,500 bytes. However, this is higher than the MTU supported by the 2G network, a router of the 2G network may not process the packets, and thus communication may be impossible.

In another example, if a user terminal having an MTU value fixed to 1,500 bytes accesses a 4G network, such as an LTE network supporting an MTU of 2,000 bytes or more, to perform data communication with a server located in a 2G network supporting an MTU value of 700 bytes, a router of the 2G network may not process the packets and thus communication may be impossible.

SUMMARY

Exemplary embodiments of the present invention provide an apparatus to set al. is maximum transmission unit (MTU) in a user terminal. The apparatus may set a basic MTU value according to a communication network connected for data communication, perform an MTU detection process with a communication counterpart, and detect and set an optimal MTU.

Exemplary embodiments of the present invention also provide a method for setting the MTU in a user terminal.

Additional features of the invention will be set forth in the description which follows, and in part will be apparent from the description, or may be learned by practice of the invention.

An exemplary embodiment of the present invention discloses an apparatus to set a maximum transmission unit (MTU) in a user terminal, including a memory unit to store a basic MTU value set per a wireless communication network, a communication network information acquisition unit to acquire information about the wireless communication network, an MTU detection unit to set the basic MTU value as a first set MTU value based on a kind of the wireless communication network included in the information about the wireless communication network, to check the validity of the first set MTU value, to increase the first set MTU value to a second set MTU value if the first set MTU value is valid as a checking result, to decrease the first set MTU value to a third set MTU value if the first set MTU value is not valid as the checking result, and to detect an optimal MTU value, and a data communication unit to perform data communication with a communication counterpart using the optimal MTU value detected by the MTU detection unit.

An exemplary embodiment of the present invention discloses a method for setting an MTU in a user terminal, including acquiring information about a wireless communication network, setting a basic MTU value as a first set MTU value, the basic MTU value based on a is kind of the wireless communication network included in the information about the wireless communication network, checking the validity of the first set MTU value, detecting an optimal MTU value by increasing the first set MTU value to a second set MTU value if the first set MTU value is valid as a checking result, and decreasing the first set MTU value to a third set MTU value if the first set MTU value is not valid as the checking result.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly is formal sense unless expressly so defined herein.

Hereinafter, an apparatus and a method for setting a maximum transmission unit (MTU) in a user terminal according to an exemplary embodiment will be described in detail with reference to the accompanying drawings.

Figure 1:
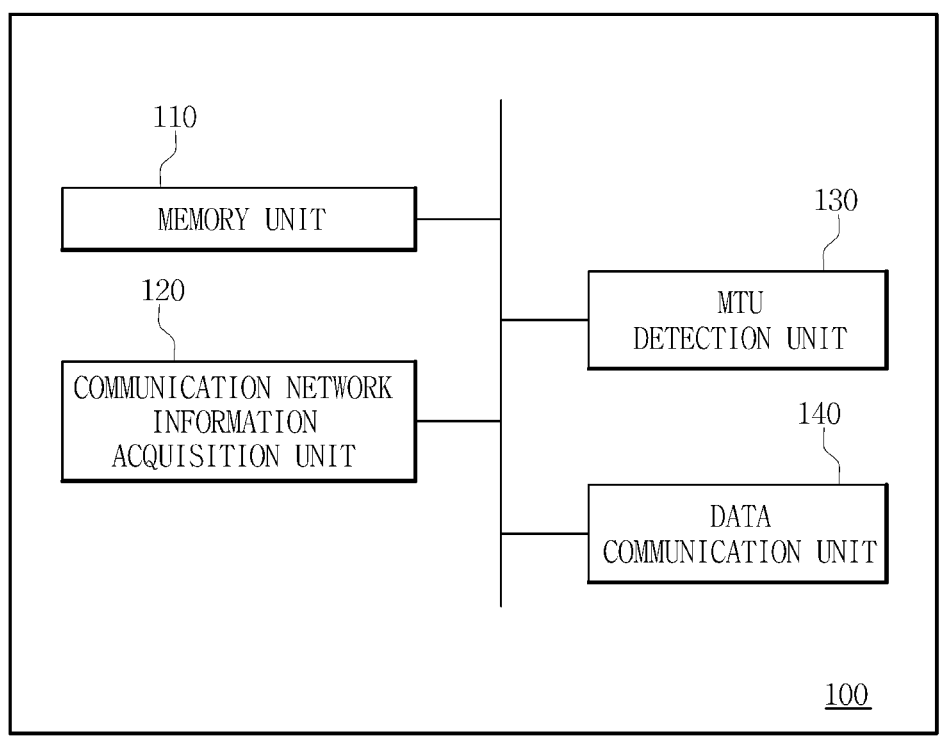
FIG. 1 is a schematic diagram showing the configuration of an apparatus to set an MTU in a user terminal according to an exemplary embodiment of the present invention.

FIG. 1 is a schematic diagram showing the configuration of an apparatus to set an MTU in a user terminal according to an exemplary embodiment of the present invention.

Referring to FIG. 1, a user terminal 100 includes a memory unit 110, a communication network information acquisition unit 120, an MTU detection unit 130, and a data communication unit 140. The memory unit 110 stores basic MTU values according to wireless communication networks, such as shown in Table 1.

TABLE 1

| Wireless communication network | Basic MTU value |
|---|---|
| 2G | 700 bytes |
| 3G | 1,500 bytes |
| 4G | 2,000 bytes |

When a user terminal 100 accesses a wireless communication network to perform data communication, the communication network information acquisition unit 120 acquires information about the wireless communication network from the connected wireless communication network. The information about the wireless communication network may include, without limitation, one or more of the kind of the wireless communication network, information about the communication provider of the wireless communication network, and location information.

The MTU detection unit 130 reads a basic MTU value from the memory unit 110 based on the kind of the wireless communication network identified in the information about the wireless communication network, which is acquired by the communication network information acquisition unit 120. The MTU detection unit 130 also sets the basic MTU value as an MTU value, and checks validity of the set MTU value. The validity of the MTU value is checked by is dividing packets by the basic MTU value set as the MTU value, transmitting the packets to a communication counterpart, and checking an error rate of a response message received from the communication counterpart.

If the error rate of the response message received from the communication counterpart is equal to or greater than a reference value, which may be predetermined, it is determined that the set MTU value is not valid. To the contrary, if the error rate of the response message received from the communication counterpart is less than the reference value, it is determined that the set MTU value is valid.

If the set MTU value is determined not to be valid, the MTU detection unit 130 decreases the MTU value, and checks the validity of the decreased MTU value. If the decreased MTU value is determined to be valid, the MTU value is set as an optimal MTU value. If the decreased MTU value is determined not to be valid, a process of decreasing the MTU value again and checking the validity of the decreased MTU value is repeatedly performed until a valid MTU value is detected. This valid MTU value may be interpreted to be the optimal MTU value. In this disclosure, the term "optimal MTU value" refers to a longest MTU value, among checked MTU values, that has an error rate less than the reference value for a response message received from the communication counterpart according to the validity-checking process described above.

If the set MTU value is valid as the result of checking the validity of the set MTU value, the MTU detection unit 130 increases the MTU value and checks the validity of the is increased MTU value. If the increased MTU value is not valid, the previous MTU value, which was determined to be valid, is set as an optimal MTU value and, if the increased MTU value is valid, the MTU value is increased again and the validity of the increased MTU value is checked. The process of increasing the MTU value and checking the validity of the increased MTU value is repeatedly performed to detect an optimal MTU value. This process may be performed for a predetermined or reference number of times. Further, the amount by which the MTU value increases with each iteration may remain constant, i.e. increase by 100 bytes per iteration, or may change, i.e. increase by 125 bytes or increase by 75 bytes per iteration. Further, the amount by which the MTU value increases with each iteration may remain constant or may change according to the determined error rate, and the determined error rate's relative value to the reference value.

If the optimal MTU suitable for data communication with the communication counterpart is detected as described above, the MTU detection unit 130 stores the detected MTU value, information about a currently connected wireless communication network, and information about the communication counterpart in the memory unit 110 as a database (DB). The information about the communication counterpart may be, without limitation, URL information of the server if the communication counterpart is a server.

When data communication with the same communication counterpart is to be performed again through the same wireless communication network, the MTU detection unit 130 reads the MTU value stored in the memory unit 110 and sets this stored MTU value as the MTU value, thereby setting the MTU value as an optimal MTU value.

The data communication unit 140 performs data communication with the communication counterpart connected through the wireless communication network using the MTU value detected by the MTU detection unit 130 and set as the optimal MTU value.

Figure 2:
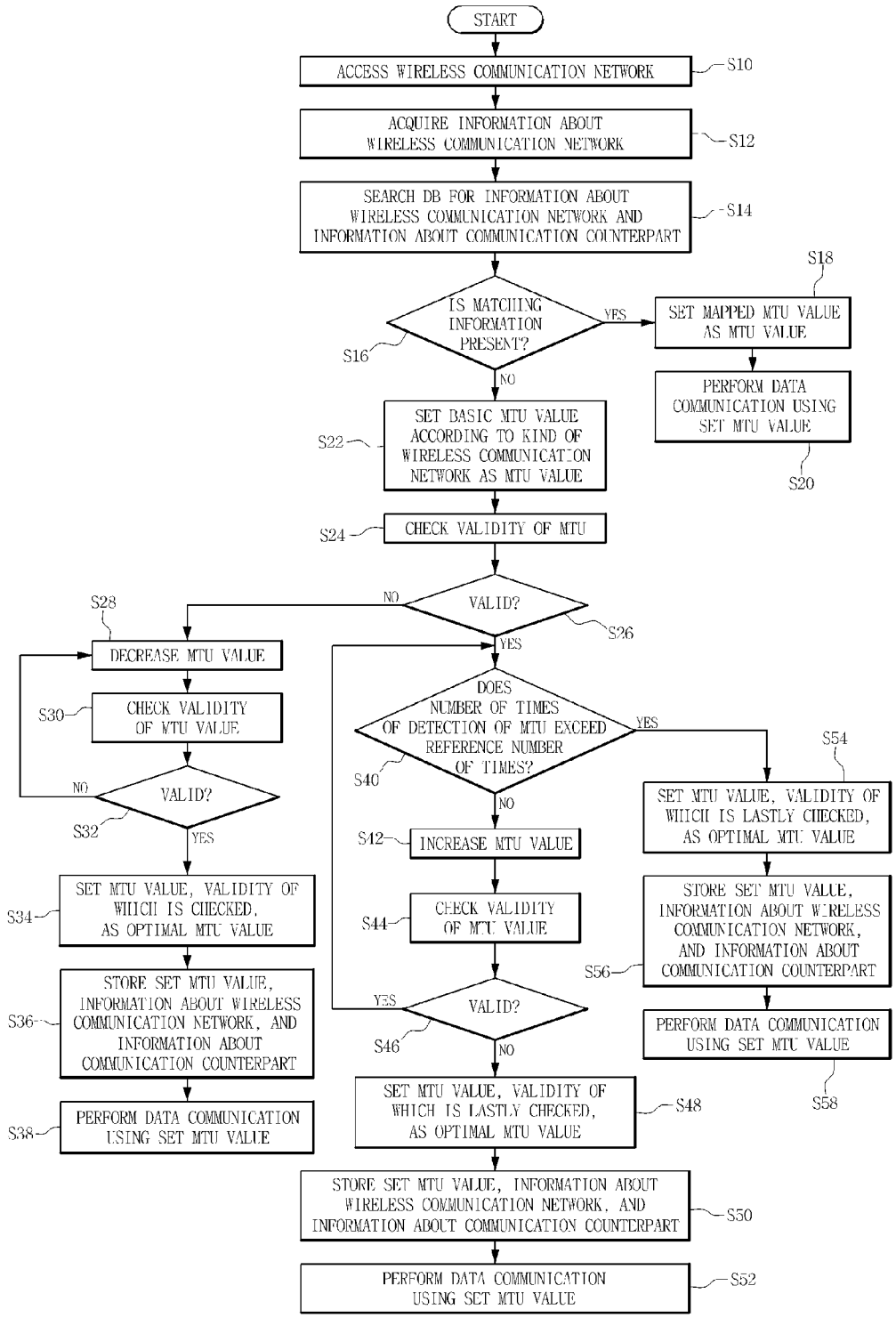
FIG. 2 is a flowchart illustrating a method for setting an MTU in a user terminal according to an exemplary embodiment of the present invention.

FIG. 2 is a flowchart illustrating a method for setting an MTU in a user terminal according to an exemplary embodiment of the present invention. FIG. 2 will be described with reference to the user terminal 100 as shown in FIG. 1. However, practicing the method shown in FIG. 2 is not limited as such.

Referring to FIG. 2, the user terminal 100 accesses the wireless communication network in order to perform data communication with the communication counterpart (S10), and acquires the information about the wireless communication network while accessing the wireless communication network (S12). During operation S12, the user terminal 100 may also acquire information about the communication counterpart.

Thereafter, the DB is searched based on the information about the wireless communication network and, if captured, the information about the communication counterpart acquired in operation S12 (S14). Then, a determination is made as to whether information matching the information about the wireless communication network and the information about the communication counterpart is present in the DB (S16).

If it is determined in operation S16 that the matching information is present in the DB, the MTU value mapped to the searched information is read and is set as the MTU value to be used in data communication with the communication counterpart (S18). Then, data communication with the communication counterpart is performed using the set MTU value (S20).

If it is determined that the matching information is not present in the DB in operation S16, the basic MTU value is read from the memory unit 110 based on the kind of the wireless communication network included in the information about the wireless communication is network acquired in operation S12, and is set as the MTU value (S22).

For example, if the wireless communication network to which the user terminal 100 is connected is a 2G network such as a CDMA 2000 network, the basic MTU value (700 bytes) of the 2G network is read from the memory unit 110 and is set as the MTU value. If the wireless communication network to which the user terminal 100 is connected is a 3G network such as a WCDMA network, the basic MTU value (1,500 bytes) of the 3G network is read from the memory unit 110 and is set as the MTU value. If the wireless communication network to which the user terminal 100 is connected is a 4G network such as an LTE network, the basic MTU value (2,000 bytes) of the 4G network is read from the memory unit 110 and is set as the MTU value.

Thereafter, the validity of the MTU value set in operation S22 is checked (S24).

The validity checking in operation S24 may be performed as described above with reference to FIG. 1. For example, the user terminal 100 divides packets by the MTU value set in operation S22, transmits the packets to the communication counterpart, receives a response message from the communication counterpart, and checks an error rate of the response message. If the error rate is equal to or greater than a reference value, it is determined that the MTU value set in operation S22 is not valid. Otherwise, if the error rate is less than the reference value, it is determined that the MTU value set in operation S22 is valid.

If it is determined that the MTU value set in operation S22 is not valid in operation S24 (S26), the MTU value is decreased (S28) and the validity of the decreased MTU value is checked again (S30).

If the decreased MTU value is not valid as the result of checking the validity in operation S30 (S32), the method proceeds back to operation S28, and the MTU value is is decreased again (S28).

If the decreased MTU value is valid as the result of checking the validity in operation S30, either in the first performance of operation S30 or in subsequent performances, the MTU value determined as valid in operation S32 is set as an optimal MTU value (S34). Also, the MTU value detected as the optimal MTU value, the information about the currently connected wireless communication network, and the information about the communication counterpart are stored in the memory unit 110 as a DB (S36), and data communication with the communication counterpart is performed using the MTU value set in operation S34 (S38).

If the MTU value set in operation S22 is valid as the result of checking the validity in operation S24 (S26), it is determined whether the number of times of MTU detection exceeds a reference number of times (S40).

If it is determined that the number of times of MTU detection does not exceed the reference number of times in operation S40, the MTU value is increased (S42) and the validity of the increased MTU value is checked again (S44).

If the increased MTU value is valid as the checking result of operation S44 (S46), the method proceeds to operation S40 of determining whether the number of times of MTU detection exceeds the reference number of times. If the increased MTU value is not valid, the last valid MTU value, which may be determined in S26 or S40, is set as the optimal MTU value (S48). Also, the MTU value detected as the optimal MTU value, the information about the currently connected wireless communication network, and the information about the communication counterpart are stored in the memory unit 110 as the DB (S50). Then, data communication with the communication counterpart is performed using the MTU value set in operation S48 (S52).

If the number of times of MTU detection exceeds the reference number of times as the determination result of operation S40, the last valid MTU value, the validity of which is lastly checked, is set as the optimal MTU (S54). Also, the MTU value detected as the optimal MTU value, the information about the currently connected wireless communication network, and the information about the communication counterpart are stored in the memory unit 110 as the DB (S56). Then, data communication with the communication counterpart is performed using the MTU value set in operation S54 (S58).

As described above, by detecting and setting the optimal MTU value according to a communication network environment, it may be possible to increase communication efficiency.

For example, if the user terminal 100 accesses a 3G network such as a WCDMA network supporting an MTU of up to 1,500 bytes to perform data communication with another terminal connected to a 4G network supporting an MTU of 2,000 bytes or more or to perform data communication with a server located in a broadband Internet network supporting an MTU of up to 2,000 bytes, the user terminal 100 reads the basic MTU value (1,500 bytes) of the 3G network from the memory unit 110, sets the read basic MTU value as the MTU value, checks the validity of the set MTU value, increases the MTU value to 1,600 bytes if the set MTU value is valid as the checking result, and checks the validity of the increased MTU value. By performing the series of processes of checking the increased MTU value and increasing the MTU value by a predetermined number of times, if, for example, 2,000 bytes is detected as the optimal MTU value, data communication with the communication counterpart may be performed in units of 2,000 bytes detected as the optimal MTU value.

In the case where the use terminal 100 accesses a 2G network such as a GPRS or CDMA network supporting an MTU of 700 bytes to perform data communication with a server located in a WCDMA network supporting an MTU of 1,500 bytes, the user terminal 100 reads the basic MTU value (700 bytes) of the 2G network from the memory unit 110, sets the read basic MTU value as the MTU value, checks the validity of the set MTU value, increases the MTU value to 800 bytes if the set MTU value is valid as the checking result, checks the validity of the increased MTU value, sets 700 bytes, the validity of which is lastly checked, as an optimal MTU value if the increased MTU value of 800 bytes is not valid, and performs data communication with the communication counterpart in units of 700 bytes detected as the optimal MTU value.

In the case where the use terminal 100 accesses a 4G network such as an LTE network supporting an MTU of 2,000 bytes or more to perform data communication with a server located in a 2G network supporting an MTU of 700 bytes, the user terminal 100 reads the basic MTU value (2,000 bytes) of the 4G network from the memory unit 110, sets the read basic MTU value as the MTU value, checks the validity of the set MTU value, decreases the MTU value to 1,800 bytes if the set MTU value is not valid as the checking result, and checks the validity of the decreased MTU value. By repeatedly performing the series of processes of checking the validity of the decreased MTU value and decreasing the MTU value, if, for example, 700 bytes is detected as the optimal MTU value, data communication with the communication counterpart is performed in units of 700 bytes detected as the optimal MTU value.

According to the apparatus and method of the present disclosure, by detecting and setting the optimal MTU according to a communication network environment, it is possible to perform data communication using a greater MTU in a higher-performance network and to is perform data communication using a lower MTU in a lower-performance network.

The apparatus and method for setting the MTU in the user terminal according to the present disclosure are not limited to the above-described exemplary embodiments and may be variously modified within an allowable range of the present disclosure. For example, although the configuration in which the optimal MTU value is detected and data communication with a communication counterpart is performed using the detected optimal MTU value is described in the foregoing embodiments, an operation for detecting an optimal MTU value may be performed while performing data communication with a communication counter part using a basic MTU value and, if the optimal MTU value is detected, data communication with the communication counterpart may be performed using the detected optimal MTU value.

While the exemplary embodiments have been shown and described, it will be understood by those skilled in the art that various changes in form and details may be made thereto without departing from the spirit and scope of the present disclosure as defined by the appended claims and their equivalents.

In addition, many modifications can be made to adapt a particular situation or material to the teachings of the present disclosure without departing from the essential scope thereof. Therefore, it is intended that the present disclosure not be limited to the particular exemplary embodiments disclosed for carrying out the present disclosure, but that the present disclosure will include all embodiments falling within the scope of the appended claims and their equivalents.

What is claimed is:

1. An apparatus to set a maximum transmission unit (MTU) in a user terminal, comprising:
    a memory unit to store a basic MTU value set per a wireless communication network;
    a communication network information acquisition unit to acquire information about the wireless communication network;
    an MTU detection unit to set the basic MTU value as a first set MTU value based on a kind of the wireless communication network included in the information about the wireless communication network, to check the validity of the first set MTU value, to increase the first set MTU value to a second set MTU value if the first set MTU value is valid as a checking result, to decrease the first set MTU value to a third set MTU value if the first set MTU value is not valid as the checking result, to detect an optimal MTU value; and
    a data communication unit to perform data communication with a communication counterpart using the optimal MTU value detected by the MTU detection unit,
    wherein the MTU detection unit stores the optimal MTU value and the corresponding information about the wireless communication network and information about the communication counterpart in the memory unit.

2. The apparatus of claim 1, wherein the MTU detection unit divides packets by the first set MTU value, transmits the packets to the communication counterpart, checks an error rate of a response message received from the communication counterpart, and checks the validity of the first set MTU value according to whether the error rate is greater than, equal to, or less than a reference value.

3. The apparatus of claim 2, wherein the MTU detection unit determines that the first set MTU value is valid if the error rate is less than the reference value.

4. The apparatus of claim 2, wherein the MTU detection unit determines that the first set MTU value is invalid if the error rate is greater than or equal to than the reference value.

5. The apparatus of claim 1, wherein the MTU detection unit decreases the first set MTU value to the third set MTU value and checks the validity of the third set MTU value if the first set MTU value is not valid as the checking result, sets the third set MTU value as the optimal MTU value if the third set MTU value is valid as the checking result, and decreases the third set MTU value to a fourth set MTU value and checks the validity of the fourth set MTU value if the third set MTU value is not valid.

6. The apparatus of claim 1, wherein the MTU detection unit increases the first set MTU value to the second set MTU value and checks the validity of the second set MTU value if the first set MTU value is valid as the checking result, sets the first set MTU value as the optimal MTU value if the second set MTU value is not valid as the checking result, and increases the second set MTU value to a fourth set MTU value and checks the validity of the fourth set MTU value to detect the optimal MTU value if the second set MTU value is valid.

7. The apparatus of claim 1, wherein the MTU detection unit increases the first set MTU value to the second set MTU value and checks the validity of the second set MTU value if the first set MTU value is valid as the checking result, sets the first set MTU value as the optimal MTU value if the second set MTU value is not valid as the checking result, and sets the second set MTU value as the optimal MTU value without increasing the second set MTU value if a number of times of MTU detection exceeds a reference number.

8. The apparatus of claim 1, wherein the optimal MTU value mapped to searched information about the wireless communication network and information about the communication counterpart is set as the first set MTU value.

9. The apparatus of claim 1, wherein the basic MTU value is set to 700 bytes if the wireless communication network is second generation (2G), 1,500 bytes if the wireless communication network is third generation (3G), and 2,000 bytes if the wireless communication network is fourth generation (4G).

10. A method for setting a maximum transmission unit (MTU) in a user terminal, comprising:
   storing a basic MTU value set per a wireless communication network;
   acquiring information about the wireless communication network;
   setting the basic MTU value as a first set MTU value, the basic MTU value based on a kind of the wireless communication network included in the information about the wireless communication network;
   checking the validity of the first set MTU value;
   detecting an optimal MTU value by increasing the first set MTU value to a second set MTU value if the first set MTU value is valid as a checking result, and decreasing the first set MTU value to a third set MTU value if the first set MTU value is not valid as the checking result;
   performing data communication with a communication counterpart using the optimal MTU value detected; and
   storing, in a memory unit, the optimal MTU value and the corresponding information about the wireless communication network and information about the communication counterpart.

11. The method of claim 10, wherein checking the validity comprises:
   dividing packets by the first set MTU value to transmit the packets to the communication counterpart;
   receiving a response message from the communication counterpart; and determining that the first set MTU value is not valid if an error rate of the response message is equal to or greater than a reference value, and determining that the set MTU value is valid if the error rate of the response message is less than the reference value.

12. The method of claim 10, wherein detecting the optimal MTU value comprises:
   decreasing the first set MTU value to the third set MTU value, and checking the validity of the third set MTU value if the first set MTU value is not valid as the checking result;
   setting the third set MTU value as the optimal MTU value if the third set MTU value is valid as the checking result; and
   decreasing the third set MTU value to a fourth set MTU value, and checking the validity of the fourth set MTU value if the third set MTU value is not valid as the checking result.

13. The method of claim 10, wherein detecting the optimal MTU value comprises:
   increasing the first set MTU value to the second set MTU value and checking the validity of the second set MTU value if the first set MTU value is valid as the checking result;
   setting the first set MTU value as the optimal MTU value if the second set MTU value is not valid as the checking result; and
   increasing the second set MTU value to a fourth set MTU value and checking the validity of the fourth set MTU value if the second set MTU value is valid as the checking result.

14. The method of claim 10, wherein detecting the optimal MTU value comprises:
   increasing the first set MTU value to the second set MTU value and checking the validity of the second set MTU value if the first set MTU value is valid as the checking result;
   setting the first set MTU value as the optimal MTU value if the second set MTU value is not valid as the checking result; and
   setting the second set MTU value as the optimal MTU value without increasing the second set MTU value if a number of times of MTU detection exceeds a reference number.

15. The method of claim 10, further comprising:
   searching a database for the information about the wireless communication network and information about the communication counterpart; and
   reading the optimal MTU value mapped to the searched information from the database and setting the optimal MTU value as the first set MTU value.

16. The method of claim 10, wherein the basic MTU value is set to 700 bytes if the wireless communication network is second generation (2G), 1,500 bytes if the wireless communication network is third generation (3G), and 2,000 bytes if the wireless communication network is fourth generation (4G).

* * * * *